United States Patent
Bagheri et al.

(10) Patent No.: US 7,773,844 B2
(45) Date of Patent: Aug. 10, 2010

(54) METHOD FOR REDUCING BANDWIDTH LOSS IN DATA CENTER APPLICATIONS WITH MULTIPLE FIBER TYPE CONNECTIVITY

(75) Inventors: Harry H. Bagheri, Poughkeepsie, NY (US); Lawrence Jacobowitz, Wappingers Falls, NY (US); Kenneth A. Scea, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,908

(22) Filed: May 16, 2008

(65) Prior Publication Data

US 2009/0285525 A1    Nov. 19, 2009

(51) Int. Cl.
*G02B 6/26* (2006.01)
*G02B 6/42* (2006.01)
*G02B 6/38* (2006.01)

(52) U.S. Cl. .................. 385/52; 385/27; 385/28; 385/39; 385/55; 385/58; 385/60; 385/66; 385/67; 385/68

(58) Field of Classification Search .............. 385/28, 385/52, 60
See application file for complete search history.

(56) References Cited

U.S. PATENT DOCUMENTS

| | | | |
|---|---|---|---|
| 4,913,507 A | 4/1990 | Stamnitz et al. | |
| 5,201,019 A | 4/1993 | Gallusser et al. | |
| 5,315,680 A | 5/1994 | Musk et al. | |
| 5,980,117 A | 11/1999 | Feuer et al. | |
| 6,014,483 A | 1/2000 | Thual et al. | |
| 6,201,908 B1 | 3/2001 | Grann | |
| 6,273,619 B1 * | 8/2001 | Shahid et al. | 385/70 |
| 6,330,382 B1 | 12/2001 | Harshbarger et al. | |
| 6,415,076 B1 | 7/2002 | DeCusatis | |
| 6,471,417 B1 * | 10/2002 | Wang et al. | 385/72 |
| 6,895,146 B1 * | 5/2005 | Wey et al. | 385/39 |
| 7,118,289 B2 | 10/2006 | Ishibashi et al. | |
| 7,184,635 B2 | 2/2007 | Livingston | |
| 7,186,035 B2 | 3/2007 | Dunn et al. | |
| 7,189,008 B2 | 3/2007 | Dye | |
| 7,352,937 B2 * | 4/2008 | Zhong et al. | 385/101 |
| 7,366,421 B2 * | 4/2008 | Cho et al. | 398/142 |
| 7,415,179 B2 * | 8/2008 | Kobayashi | 385/50 |
| 2005/0220410 A1 * | 10/2005 | Thompson | 385/39 |
| 2006/0024001 A1 * | 2/2006 | Kobayashi | 385/50 |

* cited by examiner

*Primary Examiner*—Ryan Lepisto
(74) *Attorney, Agent, or Firm*—Cantor Colburn LLP; Steven Bennett

(57) ABSTRACT

A communications coupling for a low bandwidth fiber optic cable and a high bandwidth fiber optic cable, includes: a guiding ferrule adapted for coupling to a surrogate fiber optic cable comprised of one of the low bandwidth fiber optic cable and the high bandwidth fiber optic cable, the guiding ferrule including at least one mounting feature for aligning the guiding ferrule with an optical axis of the surrogate cable; the guiding ferrule further including at least one guiding feature for aligning the optical axis of the surrogate fiber optic cable with an optical axis of a connecting fiber optic cable, the connecting fiber optic cable comprised of the other one of the low bandwidth fiber optic cable and the high bandwidth fiber optic cable. A method and a communications infrastructure are provided.

12 Claims, 4 Drawing Sheets

--PRIOR ART--

METHOD FOR REDUCING BANDWIDTH LOSS IN DATA CENTER APPLICATIONS WITH MULTIPLE FIBER TYPE CONNECTIVITY

BACKGROUND OF THE INVENTION

1. Field of the Invention

The invention herein relates to optical coupling in optical cable assemblies, and in particular to, use of ferrules with single mode tolerances in certain optical cable assemblies.

2. Background of the Related Art

Light propagates in "modes" or "waves." In an open space, the waves can propagate infinitely. However, when directing and guiding modes of light using optical fiber, propagation becomes finite. Refraction and reflection that occurs in the optical fiber results in limitation of the propagation. In a data center, transmission of optical signals relies on optical cables. Use of certain components is more problematic than others.

Consider for example that recent introduction of high bandwidth cable (e.g., "OM3" fiber cabling) into data centers. Many data centers have older, "legacy" product, which (e.g., "OM2" grade fiber cabling). This OM2 fiber has an effective modal bandwidth of about 500 Mhz/km. As improvements to components within such data centers progress, there are increased instances of high bandwidth fiber (OM3 versions) being coupled to older, limited bandwidth products (OM2 versions). This results in differential mode delay (DMD) resulting in loss of bandwidth. That is, less light will propagate down the fiber because the coupling hardware does not always align the fibers on each connections center axis.

Fiber connectors provide for a number of transmission paths. For example, fiber connectors are used to join patch panels and other connectors for continued transmission paths. These fiber-to-fiber connections rely on physical contact of one fiber to another. Often these fiber-to-fiber connections do not align well, and loss occurs. One will recognize that the fiber-to-fiber connection is a source of transmission error. That is, poor alignment results in differential mode delay (DMD) which equates to signal loss.

What is needed are techniques for connecting low bandwidth optical cable (such as OM2 cabling) with higher bandwidth cabling (such as OM3 cabling), where the connecting ensures occurrence of minimal signal loss.

BRIEF SUMMARY OF THE INVENTION

Embodiments of the invention include a communications coupling for a low bandwidth fiber optic cable and a high bandwidth fiber optic cable, the coupling including: a guiding ferrule adapted for coupling to a surrogate fiber optic cable comprised of one of the low bandwidth fiber optic cable and the high bandwidth fiber optic cable, the guiding ferrule including at least one mounting feature for aligning the guiding ferrule with an optical axis of the surrogate cable; the guiding ferrule further including at least one guiding feature for aligning the optical axis of the surrogate fiber optic cable with an optical axis of a connecting fiber optic cable, the connecting fiber optic cable comprised of the other one of the low bandwidth fiber optic cable and the high bandwidth fiber optic cable.

Also disclosed is a method for coupling a low bandwidth fiber optic cable with a high bandwidth fiber optic cable, the method including: coupling a guiding ferrule to a surrogate fiber optic cable comprised of one of the low bandwidth fiber optic cable and the high bandwidth fiber optic cable; inserting a connecting fiber optic cable comprised of the other one of the low bandwidth fiber optic cable and the high bandwidth fiber optic cable into the guiding ferrule.

Further provided is a computing infrastructure that includes at least one low bandwidth fiber optic cable and at least one high bandwidth fiber optic cable; and a communications coupling disposed between the low bandwidth fiber optic cable and the high bandwidth fiber optic cable, the coupling including a guiding ferrule adapted for coupling to a surrogate fiber optic cable comprised of one of the low bandwidth fiber optic cable and the high bandwidth fiber optic cable, the guiding ferrule also having at least one mounting feature for aligning the guiding ferrule with an optical axis of the surrogate cable; the guiding ferrule further including at least one guiding feature for aligning the optical axis of the surrogate fiber optic cable with an optical axis of a connecting fiber optic cable, the connecting fiber optic cable being the other one of the low bandwidth fiber optic cable and the high bandwidth fiber optic cable.

Other systems and methods according to embodiments will be or become apparent to one with skill in the art upon review of the following drawings and detailed description. It is intended that all such additional systems and methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed are apparatus and methods for coupling low bandwidth optical fiber cabling with higher bandwidth optical fiber cabling, where the coupling ensures minimal signal loss. Exemplary and non-limiting embodiments of lower bandwidth optical fiber cabling and higher bandwidth optical fiber cabling are referred to as "OM2" and "OM3", respectively. Accordingly, while the teachings herein are generally in the context of OM2 and OM3 cabling, one skilled in the art will recognize that such embodiments are merely exemplary and are not limiting of the invention. First, and for perspective and convenience, aspects of fiber cabling and optical communication using such cabling are discussed.

Figure 1:
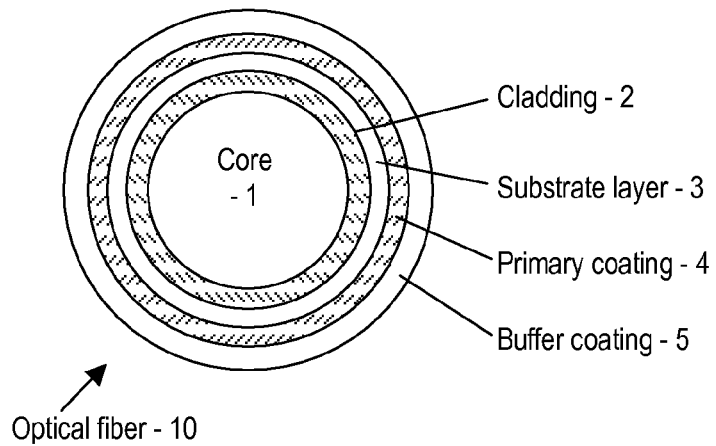
FIG. 1 is a cross sectional view of an optical cable.

Referring to FIG. 1, a cross section of a prior art optical fiber 10 is shown. Regardless of mode, all fibers include certain components such as a core 1, which carries most of the light, cladding 2 which surrounds the core 1 and bends the light and confines it to the core 1. Also included in some fibers is a substrate layer 3 surrounding the cladding 2, the substrate layer 3 being formed of glass which does not carry light, but adds to the diameter and strength of the fiber 10. The substrate layer 3 or the cladding 2 (as appropriate) is covered by a primary coating 4, which provides the first layer of mechanical protection. The primary coating 4 is, in turn, covered by a secondary buffer coating 5, which protects the relatively fragile primary coating 4 and the fiber 10.

Fiber optic cabling provides for a variety of telecommunication devices. In general, there are two main categories of optical fiber, that of multimode fiber and single-mode fiber. In the case of a multimode fiber, the diameter of the core 1 is relatively large in comparison to a wavelength of light. This means that transmitted light can propagate through the fiber 10 in many different ray paths, or modes. For example, the diameter of the core 1 ranges from about 50 micrometers (μm) to about 1,000 μm, whereas the wavelength of transmitted light is about 1 μm.

Currently, OM3 style optical cable (50μ multimode cable with 2000 Mhz/km bandwidth) is marketed as the preferred solution for optical 10 Gigabit Ficon connectivity. Much of the current infrastructure in current use is OM2 style optical cable; OM2 style is 50μ multimode cable with a bandwidth of 500 Mhz/km. There are a number of issues that could interfere with a successful error free implementation of the OM3 style product given the current hardware for multimode optical cable 10. This is primarily attributed to components for making connections, which are referred to as "ferrules." The ferrules are the hardware often used to secure the optical fibers 10 in the connectors. However, in some instances, the ferrules used for making connections exhibit standard multimode tolerances which can contribute to undesirable results at the connection point when connecting (mixing) various bandwidth cabling.

These undesirable results include excessive insertion loss, higher attenuation variations and susceptibility to off-axial stresses. In addition the off-axial stresses can result in poor physical contact at the interface resulting in differential mode delay (DMD) at the connection points. This DMD, if severe enough, can cause modal noise and bit errors.

Accordingly, apparatus and methods are provided for coupling a high bandwidth cable with a low bandwidth cable. Included are techniques for use of ferrules with single mode tolerances in multi-mode applications.

Among other things, the invention provides for a mode condition (or mode conditioner) wherein an acceptance cone optic axis is co-linear (generally exhibits centricity) with a transmitting (or receiving) fiber optic axis, such that interference effects are minimized or eliminated. The minimizing or eliminating enables maximum transfer of propagating waves across the transition. Interfacial reflections at the coupling, which may generate phase noise, are similarly minimized or eliminated. The fan of angles and their exact values may be determined according to a variety of factors, such as dimensional aspects of the respective fiber(s). Various embodiments may be employed.

In a first embodiment, single mode ferrules, such as those presently commercially available, are employed with multimode fiber. These single mode ferrules already have the tight tolerances required for improved performance. Various physical adaptations to the single mode ferrule may be realized to provide for coupling of the multi-mode fiber cabling to the single-mode fiber cabling.

Figure 2:
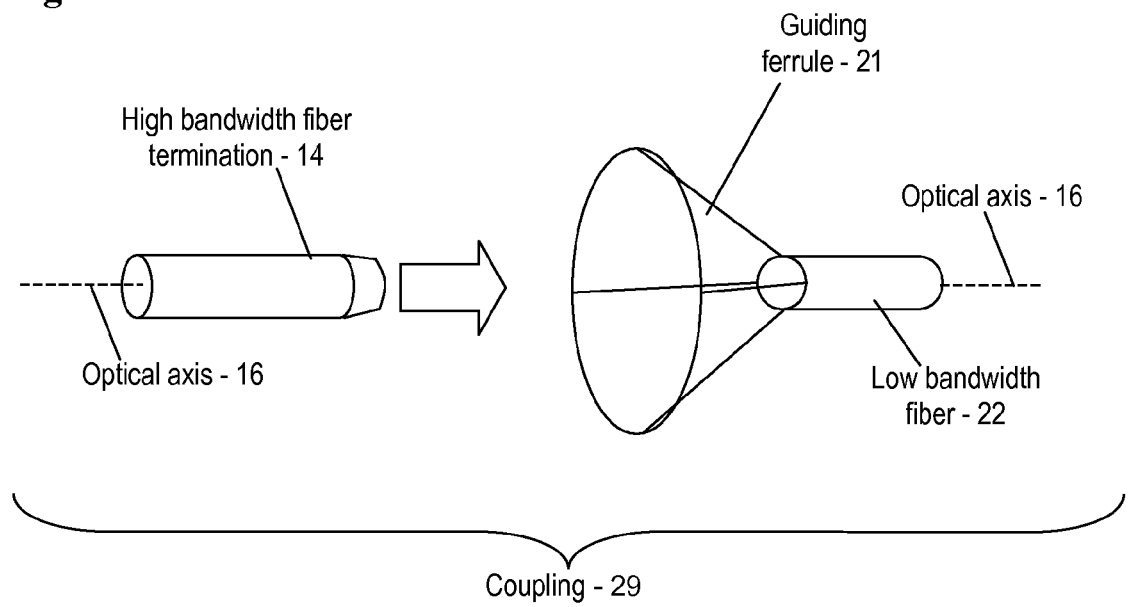
FIG. 2 depicts aspects of a termination for a low-bandwidth optical cable.

In other embodiments, such as those including physical adaptations, the ferrule includes a flanged opening to facilitate the insertion of larger multimode fiber during cable assembly. Reference may be had to FIG. 2.

In FIG. 2, a guiding ferrule 21, (in this example, a conical shaped guiding ferrule 21) is shown. The guiding ferrule 21 is shown as being coupled to a low bandwidth fiber 22 (e.g., a single-mode fiber) along an optical axis 16. In this embodiment, the guiding ferrule 21 exhibits single mode tolerance and single mode dimensions. The guiding ferrule 21 includes a flanged opening for insertion and forcing alignment of a high bandwidth fiber termination 14. Generally, the alignment of the high bandwidth fiber termination 14 with the low bandwidth fiber 22 is provided by ensuring alignment of each fiber along the respective optical axis 16. Installation of the high bandwidth fiber termination 14 into the guiding ferrule 21 provides for formation of a coupling 29 that couples the high bandwidth fiber 11 (shown in FIG. 3) with the low bandwidth fiber 22.

Generally, the guiding ferrule 21 includes at least one feature for securely mounting and aligning the guiding ferrule 21 about the optical axis 16 of a surrogate fiber optic cable (that is, one of the high bandwidth fiber 11 and the low bandwidth fiber 22). Such mounting features are known in the art, and therefore not discussed further herein.

Of course, the guiding ferrule 21 will be appropriately adapted for receipt of a connecting fiber optic cable (that is, the other fiber optic cable that is to be coupled to the surrogate fiber optic cable). Accordingly, the example provided here, where the guiding ferrule 21 is mounted upon the low bandwidth fiber 22, is merely exemplary and is not limiting.

The guiding ferrule 21 may include mounting features exhibiting single mode tolerances with receiving features having multi-mode tolerances, or vice versa. That is, the guiding ferrule 21 may include mounting features exhibiting multi-mode tolerances with receiving features having single-mode tolerances. Regardless, the guiding ferrule 21 provides for alignment of the optical axis 16 of the surrogate fiber optic cable with the optical axis 16 of the connecting fiber optic cable.

Figure 3:
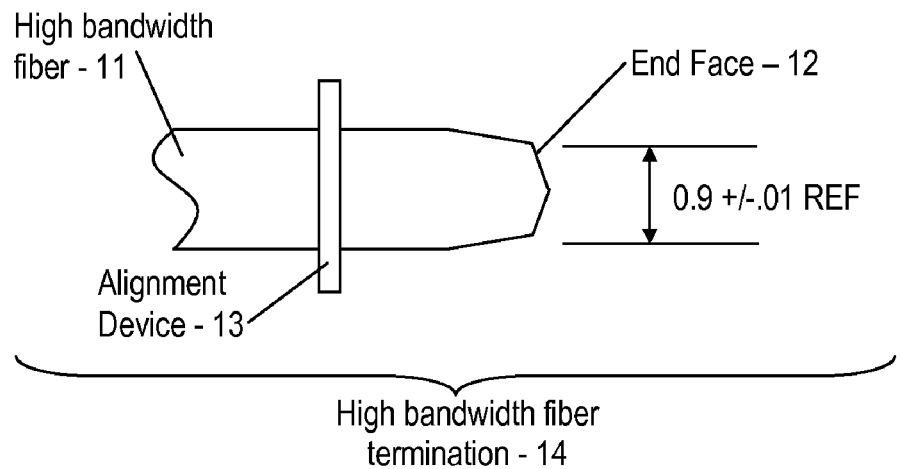
FIG. 3 depicts apparatus for coupling the low-bandwidth optical cable of FIG. 2 with a high bandwidth optical cable.

In FIG. 3, it is shown that certain adaptations to the high bandwidth fiber 11 may also be made to provide for an effective high bandwidth fiber termination 14. In this non-limiting example, at least one of the cladding 2, the substrate layer 3, the primary coating 4, the buffer coating 5 (and/or other coatings or layers as may be used to construct the fiber 11) are at least partially removed to provide for the high bandwidth fiber termination 14. As shown, this process may provide an end face 12 that is some radius smaller than that of the entire fiber 11 (such as 0.9 times that of the fiber 11). In some embodiments, an alignment device 13 (such as an additional flange) is added to the fiber 11 to ensure alignment with the guiding ferrule 21.

More specifically, an end (and the end face 12) of the fiber to be used for coupling may be physically adapted by tapering, flaring or by other similar adaptations or deformations to enhance launch conditions. That is, adaptations or deformations may be included and formed to provide for maximized admittance and minimized vinetting to satisfy launch conditions for propagation between segments. In general, use of the guiding ferrule 21 provides for aligning transmission paths for transmitted light such that a launch condition is less than or equal to an acceptance angle.

In some embodiments, the alignment device 13 includes an additional flange. In other embodiments, the alignment device 13 may include at least one of a key, a keyway, a spline, a detent, a groove, a lock, a twist lock or other such feature as may be known or devised for ensuring at least one of alignment and retention of the communications connection.

In general, the guiding ferrule 21 includes guiding features for ensuring alignment of the high bandwidth fiber 11 with the low bandwidth fiber 22. Aside from embodiments including a conical shape, other embodiments may include (in addition or separate from the conical shape), at least one of a key, a keyway, a spline, a detent, a groove, a lock, a twist lock or other such feature as may be known or devised for ensuring at least one of alignment and retention of the communications connection. In general, when incorporating a conical shape, a right circular cone is employed.

Thus, disclosed herein is a coupling that includes a means for mounting the ferrule upon a surrogate fiber optic cable, a means for guiding a connecting fiber optic cable into the guiding ferrule and, in some embodiments, means for aligning the connecting fiber optic cable with the surrogate fiber optic cable.

In general, the guiding ferrule 21 provides for reductions in alignment offset and mode conditioning that results in reliable connections between various modes of fiber. That is, for example, by using a guiding ferrule 21 to form a coupling 29 of the high bandwidth fiber 11 with the low bandwidth fiber 22, reductions in losses from differential mode delay (DMD) are realized.

Advantageously, the teachings herein are useful for various commercially available components including multimode LC and MPO/MTP style connectors. In addition, the guiding ferrule 21 provides for simple assembly of couplings 29.

Various techniques may be used for design of the guiding ferrule 21. That is, for example, mathematical or computer modeling of fibers and waveguides may be used to provide for improved performance and signal transmission. In that regard, consider the following regarding mode conditioning and aspects of the guiding ferrule 21.

A physics-based design of a mode transformer or mode conditioner for an interface between OM2 and OM3 fiber segments must consider the physical nature of the light sources, the optical properties of the fiber segments, the launch boundary conditions into each fiber segment, and the geometry of the ferrule connector implementation. Consider, for example, certain aspects of the OM2 fiber and then the OM3 fiber with reference to FIGS. 5-8.

Figure 4:
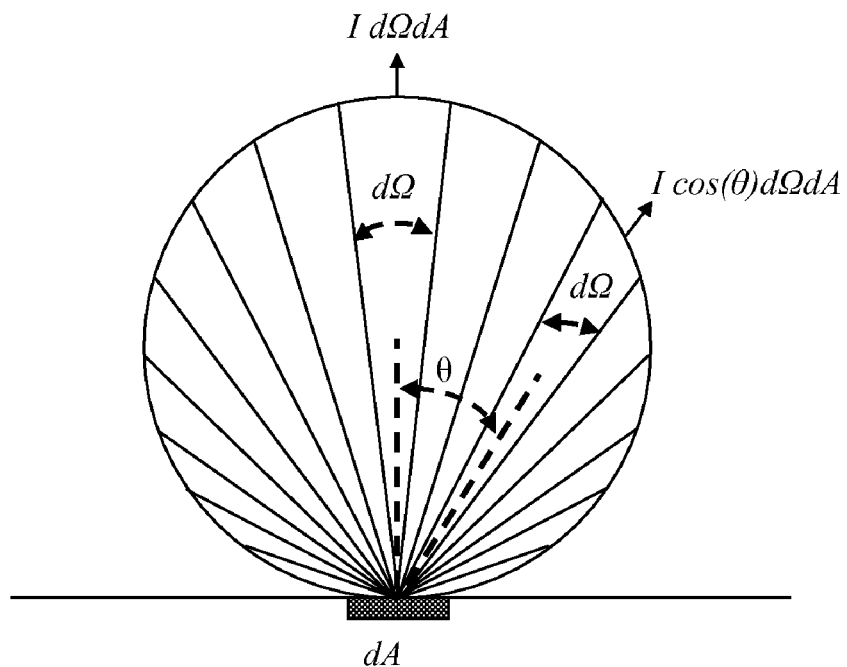
FIG. 4 illustrates a Lambertian emission pattern.
Figure 5:
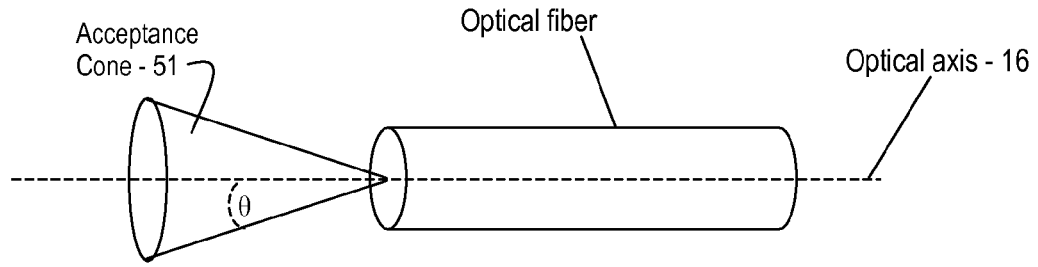
FIGS. 5 through 8 depict aspects of fiber with regard to mode conditioning.
Figure 6:
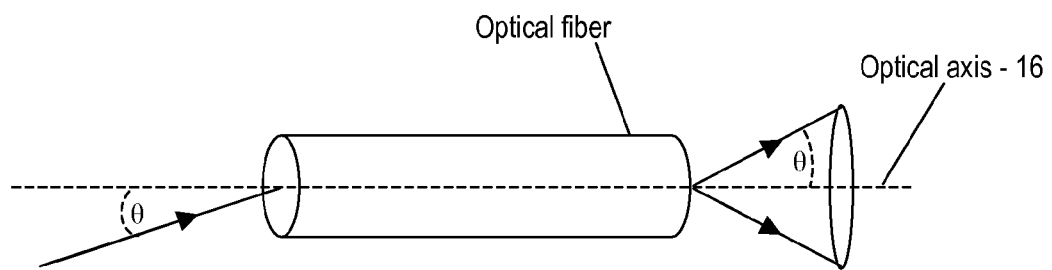

OM2 fiber is specified as a multimode fiber with 50 micron core diameter, designed for an incoherent light source such as a Lambertian emitting LED, launched in OFL (i.e., overfilled, with an EMB=500 MHz.km, effective modal bandwidth). The Lambertian emission pattern, shown in FIG. 4, illustrates cosine-law dependence of the intensity (I) variation, measured by the angle θ, sweeping away from the normal (perpendicular) axis from an emitting element, dA, in an increment of solid-angle dΩ. It is clear that the optical power (e.g., mWatts) entering a fiber endface from an LED will depend on the fan of angles determined by the LED alignment and coupling lens used, and, any translational offsets of the light source axis to the fiber optic axis.

OM3 multimode fiber is also 50 micron core diameter, but optimized for a coherent light source, such as an 850 nm VCSEL or semiconductor laser, having an EMB=2000 MHz.km. Geometric optics defines a numerical aperture, N.A., as the sine of the acceptance cone half-angle, sin θ, depicted in FIG. 5. For an incoherent light source, ray optics provides a good approximation for the collection of the entering light cone. For laser light obeying a Gaussian intensity distribution profile, significant Fresnel diffraction effects will occur when the emission cone overfills the acceptance aperture 51, because of truncating at the index of refraction boundary between the fiber core and cladding. In multimode fiber, significant modal noise/phase noise will be generated if the launch condition is identical to a Lambertian LED.

Since both OM2 and OM3 fibers share the 50 micron core dimension, a mode transformer or mode conditioner is essential for the launch between the fiber segments in order to optimize power efficiency coupled between the fiber segments. Even the most precise of ferrules cannot assure power coupling optimization. In general, high spatial frequencies or modes will be truncated across the annular zone for cone angles greater than the effective fiber core NA angle. "Impedance matching" for maximum power transfer thus requires a tapered section or its physical equivalent, such as a section of fiber having gradients or zones of varying refractive index.

Figure 7:
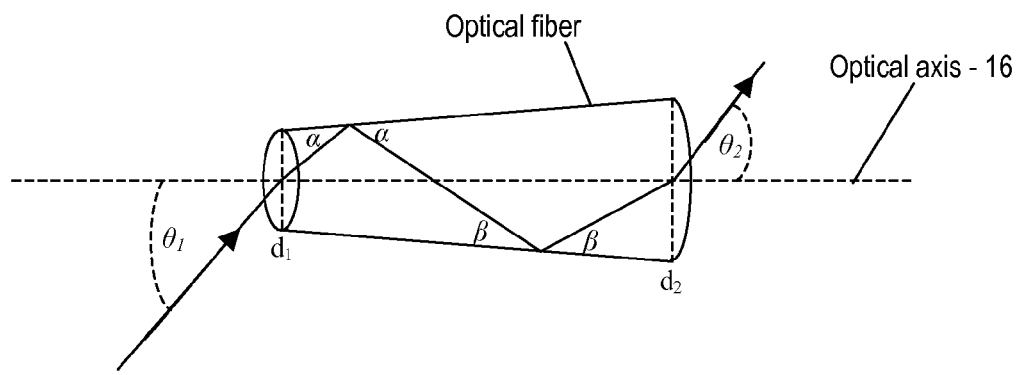

Tapered fibers are governed by one important law, provided as Eq. (1):

$$d_1 \sin(\theta_1) = d_2 \sin(\theta_2) \quad (1).$$

where diameters and angles are as shown in FIG. 7.

With regard to FIG. 7, the angle of reflection of a light ray is equal to the angle of incidence; therefore, light entering the small end of a fiber becomes more collimated as the diameter increases because the reflecting surface is not parallel to the fiber axis. Collimated light entering tapered fibers at the large end, on the other hand, becomes decollimated, and if the angle of incidence exceeds the acceptance angle, it will pass through the side of the fiber. If the incoming light is in a small angle, the outgoing flux per unit area can be increased. Conversely, where the geometric optics approximation is valid, as for LED incoherent light sources, FIG. 7 may be viewed in reverse with arrows from right to left for the direction of light travel.

Figure 8:
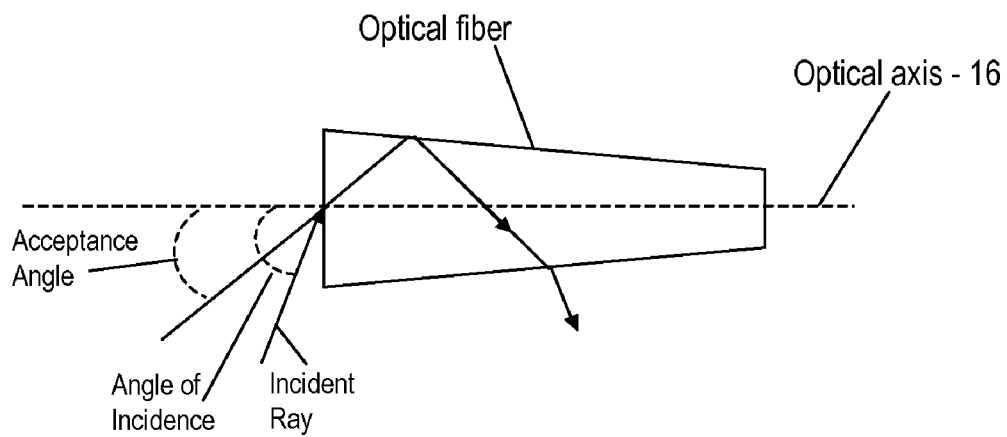

FIG. 8 also illustrates transmission from a large to a small endface of a transmission taper. The design concept of the taper being the slope inducing the variation of the differential light cones created from the total internal (frustrated) reflection angles.

A specific manufacturing design will apply the foregoing physics-based design principles for light sources, manufacturing tolerances in ferrules, and other factors.

Figure 9:
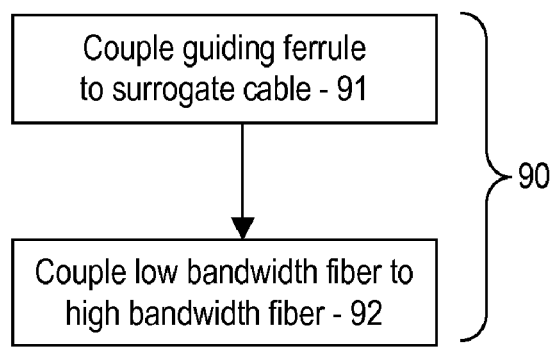
FIG. 9 is a flow chart providing a method for coupling the low-bandwidth optical with high bandwidth optical cable.

In FIG. 9, a method for forming a coupling 90 is provided. The exemplary method calls for coupling the guiding ferrule 91 to the low bandwidth fiber 22. Subsequently, the high bandwidth fiber 11 is inserted into the guiding ferrule 21 and coupled with the low bandwidth fiber 92.

Of course, the guiding ferrule 21 could be designed for initial coupling to the high bandwidth fiber 11. Further, the method might include additional tasks for removing layers over the core 1 of at least one of the fibers 11, 22; as well as securing the coupling 29 (such as by locking a lock).

One skilled in the art will recognize that the teachings provided herein are useful for couplings with single direction or bi-directional signaling.

While the invention has been described with reference to exemplary embodiments, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A communications coupling for a low bandwidth fiber optic cable and a high bandwidth fiber optic cable, the coupling comprising:
   a guiding ferrule adapted for coupling to a surrogate fiber optic cable comprised of one of the low bandwidth fiber optic cable and the high bandwidth fiber optic cable, the guiding ferrule comprising at least one mounting feature for aligning the guiding ferrule with an optical axis of the surrogate cable; and
   the guiding ferrule further comprising at least one guiding feature for aligning the optical axis of the surrogate fiber optic cable with an optical axis of a connecting fiber optic cable, the connecting fiber optic cable comprised of the other one of the low bandwidth fiber optic cable and the high bandwidth fiber optic cable, wherein:
   at least one of the fiber optic cables includes an overlapped section defined as an entire section thereof, which is perimetrically surrounded by the at least one guiding feature, and
   the at least one guiding feature includes a flanged opening extending axially along a substantial entirety of the overlapped section of the at least one of the fiber optic cables.

2. The coupling as in claim 1, wherein the low bandwidth fiber comprises a single mode fiber optic cable.

3. The coupling as in claim 1, wherein the high bandwidth fiber comprises a multi-mode fiber optic cable.

4. The coupling as in claim 1, wherein the at least one guiding feature comprises at least one of a key, a keyway, a spline, a detent, a groove, a lock, and a twist.

5. The coupling as in claim 1, wherein the at least one guiding feature comprises a conical shape.

6. The coupling as in claim 1, wherein the connecting fiber optic cable comprises at least one alignment feature comprising at least one of a key, a keyway, a spline, a detent, a groove, a lock, a twist lock and a feature for ensuring at least one of alignment and retention.

7. The coupling as in claim 1, wherein at least one of the surrogate fiber optic cable and the connecting fiber optic cable comprise a termination comprising an area where at least one of a coating and a layer of the fiber optic cable is at least partially removed.

8. The coupling as in claim 1, wherein a core of one of the surrogate fiber optic cable and the connecting fiber optic cable comprises a diameter in a range of about 50 micrometers ($\mu$m) to about 1,000 $\mu$m.

9. The coupling as in claim 1, wherein use of the guiding ferrule provides for reductions in at least one of alignment offset and mode conditioning and results in a reliable communications connection.

10. The coupling as in claim 1, wherein the guiding ferrule comprises a geometry that reduces at least one of interfacial reflections and noise in launch conditions.

11. A computing infrastructure comprising:
    at least one low bandwidth fiber optic cable and at least one high bandwidth fiber optic cable; and
    a communications coupling disposed between the fiber optic cables, the coupling comprising:
    a guiding ferrule adapted for coupling to a surrogate fiber optic cable comprised of one of the low bandwidth fiber optic cable and the high bandwidth fiber optic cable, the guiding ferrule comprising at least one mounting feature for aligning the guiding ferrule with an optical axis of the surrogate cable; the guiding ferrule further comprising at least one guiding feature for aligning the optical axis of the surrogate fiber optic cable with an optical axis of a connecting fiber optic cable, the connecting fiber optic cable comprised of the other one of the low bandwidth fiber optic cable and the high bandwidth fiber optic cable, wherein:
    at least one of the fiber optic cables includes an overlapped section defined as an entire section thereof, which is perimetrically surrounded by the at least one guiding feature, and
    the at least one guiding feature includes a flanged opening extending axially along a substantial entirety of the overlapped section of the at least one of the fiber optic cables.

12. The computing infrastructure as in claim 11, wherein the coupling is adapted for at least one of minimized noise and maximized signal transmission.

* * * * *